(12) United States Patent
Beveridge et al.

(10) Patent No.: US 11,099,875 B2
(45) Date of Patent: *Aug. 24, 2021

(54) AUTO-ADAPTIVE VIRTUAL DESKTOP PERSISTENCE

(71) Applicant: VMware, Inc., Palo Alto, CA (US)

(72) Inventors: Daniel James Beveridge, Apollo Beach, FL (US); Yao Zhang, Beijing (CN); Jairam Choudhary, Santa Clara, CA (US)

(73) Assignee: VMware, Inc., Palo Alto, CA (US)

(*) Notice: Subject to any disclaimer, the term of this patent is extended or adjusted under 35 U.S.C. 154(b) by 180 days.

This patent is subject to a terminal disclaimer.

(21) Appl. No.: 16/433,373

(22) Filed: Jun. 6, 2019

(65) Prior Publication Data

US 2019/0286472 A1 Sep. 19, 2019

Related U.S. Application Data

(63) Continuation of application No. 15/877,373, filed on Jan. 22, 2018, now Pat. No. 10,331,475, which is a continuation of application No. 15/173,826, filed on Jun. 6, 2016, now Pat. No. 9,898,328.

(51) Int. Cl.
*G06F 9/455* (2018.01)
*G06F 8/61* (2018.01)
*G06F 9/451* (2018.01)

(52) U.S. Cl.
CPC ............ *G06F 9/45558* (2013.01); *G06F 8/61* (2013.01); *G06F 9/452* (2018.02); *G06F 2009/4557* (2013.01)

(58) Field of Classification Search
None
See application file for complete search history.

(56) References Cited

U.S. PATENT DOCUMENTS

| | | | |
|---|---|---|---|
| 8,856,783 B2* | 10/2014 | Sharp | G06F 11/3495 718/1 |
| 9,569,276 B2* | 2/2017 | Kelly | G06F 9/5061 |
| 2010/0070978 A1 | 3/2010 | Chawla et al. | |
| 2012/0210333 A1 | 8/2012 | Potter et al. | |
| 2013/0332610 A1 | 12/2013 | Beveridge | |
| 2015/0256898 A1 | 9/2015 | Morton et al. | |

* cited by examiner

*Primary Examiner* — Eric C Wai

(57) ABSTRACT

An adaptive virtual desktop architecture is provided. Application install or assignment is evaluated, such as by using heuristics to identify applications that may present compatibility problems. Upon determining that a newly installed application may have compatibility problems when associated with a non-persistent virtual desktop, a promotion to a persistent virtual desktop occurs.

20 Claims, 10 Drawing Sheets

AUTO-ADAPTIVE VIRTUAL DESKTOP PERSISTENCE

CROSS REFERENCING TO RELATED APPLICATION

This application is a continuation of U.S. patent application Ser. No. 15/877,373, entitled "Auto-Adaptive Virtual Desktop Persistence", filed Jan. 22, 2018, which is a continuation of U.S. patent application Ser. No. 15/173,826, now U.S. Pat. No. 9,898,328, entitled "Auto-Adaptive Virtual Desktop Persistence", filed Jun. 6, 2016, the entirety of which is incorporated herein by reference.

BACKGROUND

As computing develops, it becomes more resource and infrastructure intensive. Processing speeds are increasing, but demands for high-volume, shared storage, access to computing resources in diverse locations, and better security are also increasing. Many users have turned away from traditional desktop computing to more sophisticated desktop virtualization technologies (e.g., remotely hosted desktops, Desktop-as-a-Service (DAAS), virtual desktop infrastructure (VDI), etc.) connected to resources by way of the cloud. Desktop virtualization technologies allow users to create individual virtual desktop sessions on demand, with each session connecting a user to a virtual desktop session which appears to the user the same as a traditional desktop computing session. During the virtual desktop session, the user uses a terminal or a client device to log into their desktop that is running on a remote server and is presented with all of the applications, documents, and other resources as though the user had logged into a traditional desktop computer. User-specific preferences and settings are stored, and the experience is the same regardless of the user's location. The virtual desktop session provides the flexibility the user needs, with the traditional format that the user is comfortable with. However, provisioning a virtual desktop session on-demand for a user presents challenges to applications which were not designed with the advanced virtual desktop environment in mind. Some of these applications experience errors when executed in an on-demand virtual desktop environment.

Some existing systems provision virtual desktops for application delivery. However, on-demand layering construction of virtual desktops lacks compatibility with certain classes of applications such as those which have service or driver components that must be started much earlier in the desktop lifecycle, such as before users log in. These classes of applications may fail to load properly, or return errors upon execution, causing the user and administrators to conclude that the virtual desktop session is inconsistent and unreliable. These experiences cause administrators to take a conservative and more expensive approach with virtual desktop environment design, allocating a complete 'full clone' to each user. Administrators in these examples provide each user with a persistent desktop so that full application compatibility may be guaranteed. This approach, however, adds extra cost and is inefficient.

SUMMARY

One or more embodiments described herein provide a decision-free, adaptive virtual desktop interface architecture. Installation or assignment of an application to a user-writable volume associated with a non-persistent virtual desktop is monitored. The operation, characteristics, or attributes of the application are evaluated. Upon determining that the application has one or more attributes that will potentially present a challenge or a problem when executed on a non-persistent desktop, an available persistent virtual desktop is identified, the user account is assigned to the identified, available persistent virtual desktop, the user account is promoted to the persistent pool, and the identified user account is de-associated from the non-persistent pool.

This summary introduces a selection of concepts that are described in more detail below. This summary is not intended to identify essential features, nor to limit in any way the scope of the claimed subject matter.

BRIEF DESCRIPTION OF THE DRAWINGS

Corresponding reference characters indicate corresponding parts throughout the drawings.

DETAILED DESCRIPTION

Figure 1:
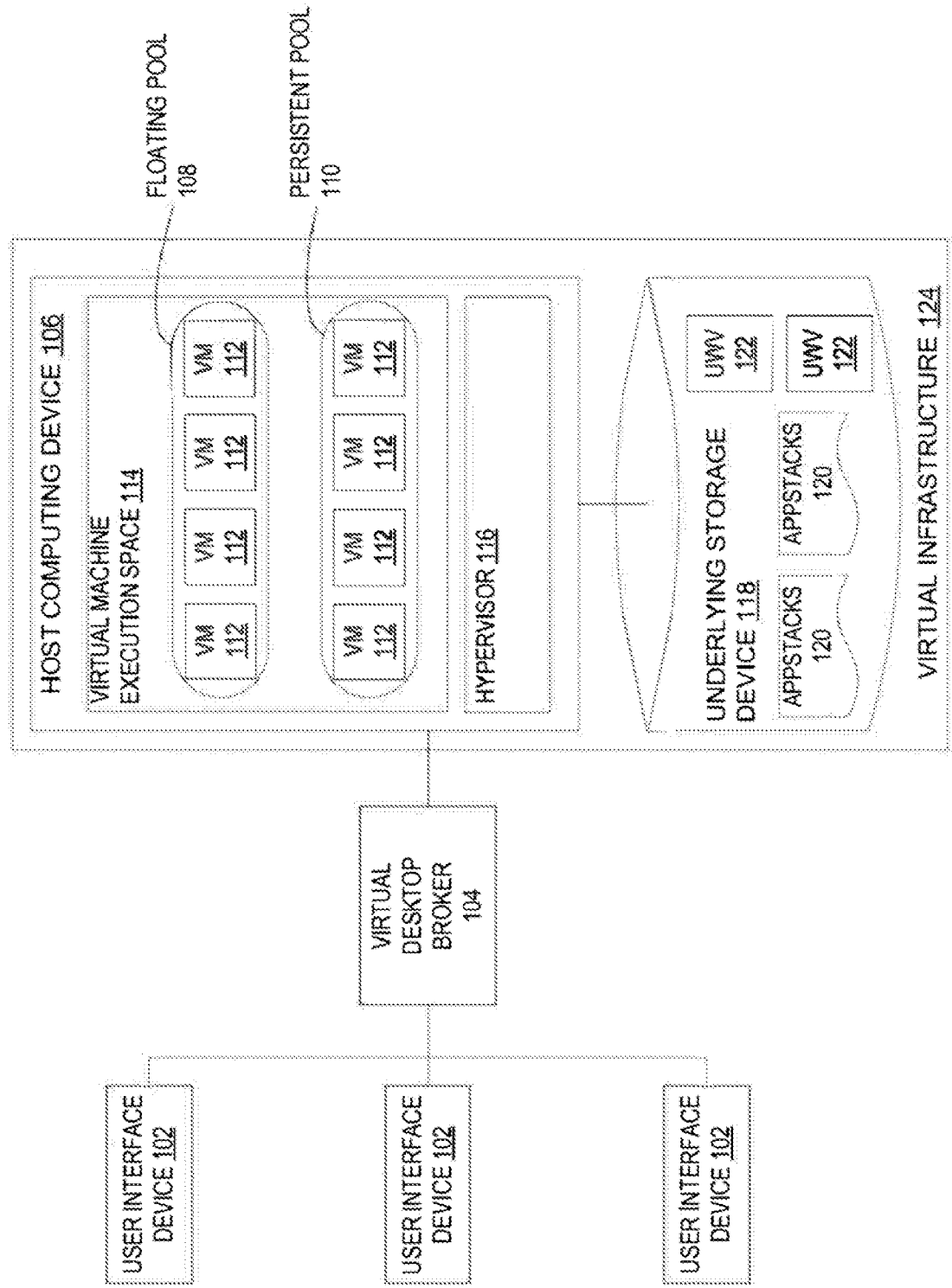
FIG. 1 is a block diagram of an exemplary system for decision free provisioning of virtual desktops to users.

Storage has been a large cost element in virtual desktop infrastructure (VDI) implementations. Linked-clones help resolve this challenge as do other similar copy-on-write constructs, which help to reduce consumption. However, when it is time to change the shared desktop image, all copy-on-write journal files are invalidated, meaning that user state is discarded. This routine discarding of user state poses a challenge that spawns a range of technologies such as application virtualization and advanced WINDOWS brand operating system profile management meant to help restore the lost state information after the shared image was changed. The stateless VDI model presents opportunities such as the ability to assign users to any available VM at the point of request, something that would have been hard to achieve if user state preservation was necessary.

With the need to reduce cost at the forefront of VDI customer's minds, the stateless VDI model works well. However, this stateless model has some hidden costs in the areas of operational complexity, application management, and heavy professional services needed for success. Increasingly, knowledge workers also want more ability to customize their virtual desktops. The non-persistent model, while efficient, appears to be more of a niche for task workers, and less appropriate for mainstream adoption.

To provide end-users with a full featured desktop experience including the ability to install any software they might want, VDI admins can provision persistent desktops which are VMs assigned statically to users and to which users return at each login to the VDI broker. Persistent desktops meet the needs of knowledge workers but generally include full-clone VMs, which drives up storage costs. Moreover, persistent VMs are left powered up and running all the time, even when users have been absent for days, to facilitate an acceptable response time when users log back into the broker and request their desktop. However, no user wants to wait for a VM to power on and boot up when they need it. As such, persistent VDI solutions are expensive, and have thus led to smaller deployments.

In contrast, embodiments described herein allow automatically adaptive promotion between non-persistent and persistent virtual desktops based on detection of application compatibility with a non-persistent virtual desktop environment. Virtual desktops may be provisioned from either a persistent or a floating (non-persistent) pool based upon the characteristics of applications installed on the virtual desktop. In the persistent pool, the user-writable volume or disk is permanently mounted to a specific virtual machine (VM) that the user will return to on each virtual desktop session. Alternatively, the user-writable volume or disk is permanently mounted to a specific physical desktop. In the non-persistent (floating) pool, the user can be assigned any VM from the pool because the VMs in the floating pool are stateless in the sense that they do not retain user-specific state after the user has logged off. The disclosed system evaluates the characteristics, attributes, or the like, of newly installed applications on non-persistent virtual desktops to determine whether those applications are known to, or anticipated to, provide a challenge to the operation of a non-persistent virtual desktop. Upon determining that the newly installed application will present a challenge to a non-persistent virtual desktop, the system promotes the user to a persistent virtual desktop.

Not all applications are compatible with some existing methods of non-persistent provisioning of virtual desktops. For instance, some methods of non-persistent provisioning leverage shared copy-on-write (COW) pages, by attaching COW pages to a VM upon provisioning. This enables the rapid, or "just-in-time" (JIT) provisioning of VMs, as VMs are rapidly provisioned and configured upon demand. However, JIT desktops are sometimes unreliable with certain applications. As an example, early services and drivers, applications tied to machine names, and applications which require work performed before user login are some examples of applications that may cause problems or challenges when being executed on a non-persistent desktop. The disclosed system essentially performs a post-installation assessment of the compatibility of applications with JIT desktops. The system provides the resource savings of the JIT desktop systems the bulk of the time, while identifying the cases where JIT desktops will fail, and promoting the users to persistent virtual desktops in those circumstances. Because of this responsive capability, applications are less prone to failing, freeing up time and resources. The system provides a seamless experience for users, as promotion to persistent virtual desktops is performed after users log off. The disclosed system results in most users receiving and retaining an efficient low-cost desktop while giving the more expensive 'persistent' virtual desktop only to those users who genuinely need it based on application requirements. This auto-adaptive design resolves the dilemma that forces IT to choose between low cost and application compatibility, instead providing both.

For example, the application installation process is monitored during packaging of applications or during user self-install activity. Upon completion of the installation, the applications are checked against a promotion policy or a database to evaluate whether any of the applications are known to have conditions leading to incompatibility (e.g., with the just-in-time dynamic layering desktop). If an administrator or the user is packaging such an application, the application is flagged in the application metadata. Subsequently, when the administrator assigns such an application to one or more users, or the users are installing the application, these users are promoted to a persistent virtual desktop so that the assigned application is present to the operating system immediately at the time of boot, reducing or eliminating incompatibilities. Any services and drivers that need to start early in the boot up are thus be able to do so. If a user self-installs such an application, the application is detected and the user is promoted to a persistent desktop at the next opportunity (e.g., their next logoff, or their next login).

FIG. 1 is a block diagram of an exemplary system for decision free provisioning of virtual desktops to users. User interface devices 102 communicate with the virtual desktop broker 104, also known as a virtual desktop broker. User interface devices 102 include desktop computers, laptop computers, tablets, thin desktops, and/or other devices.

Figure 3:
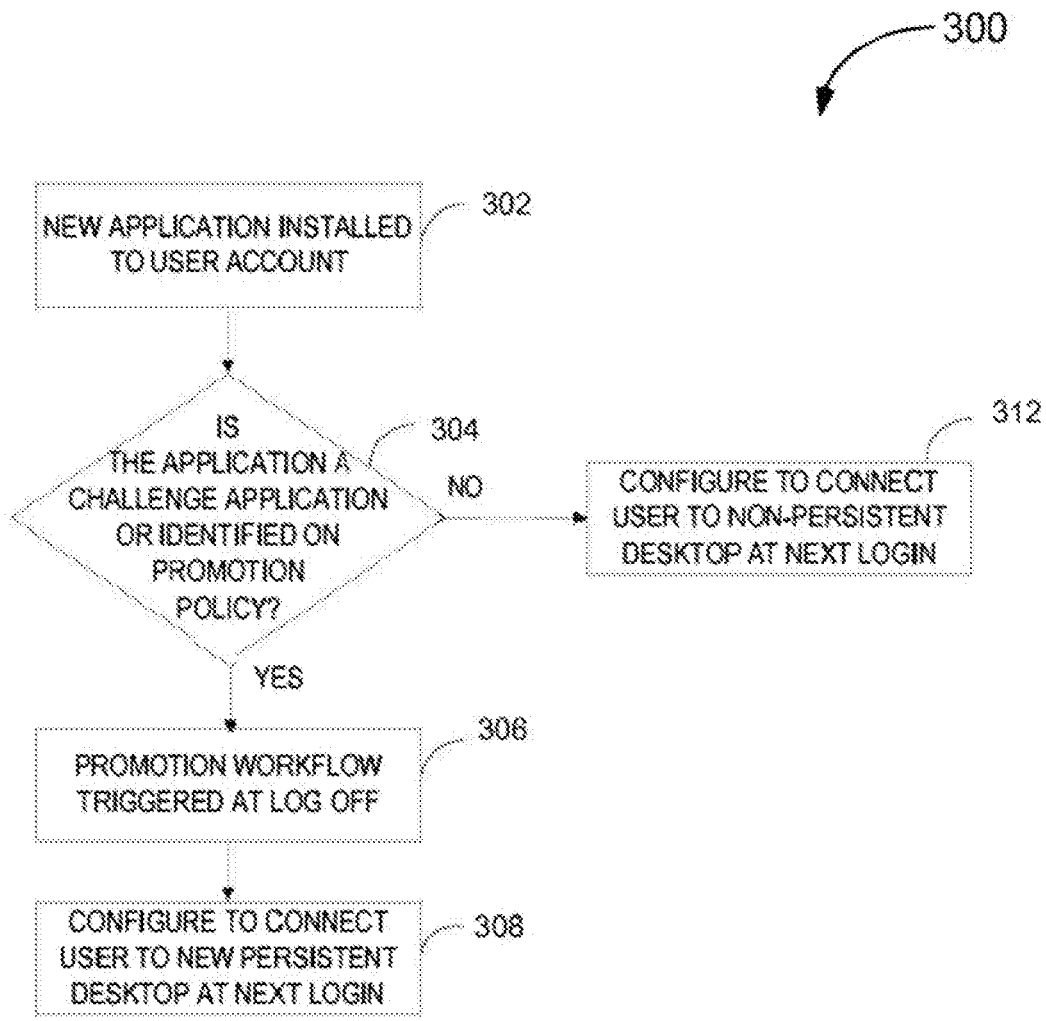
FIG. 3 is a flowchart of an exemplary method of promoting a user-writable volume from the floating pool to the persistent pool based upon an installed application.
Figure 4:
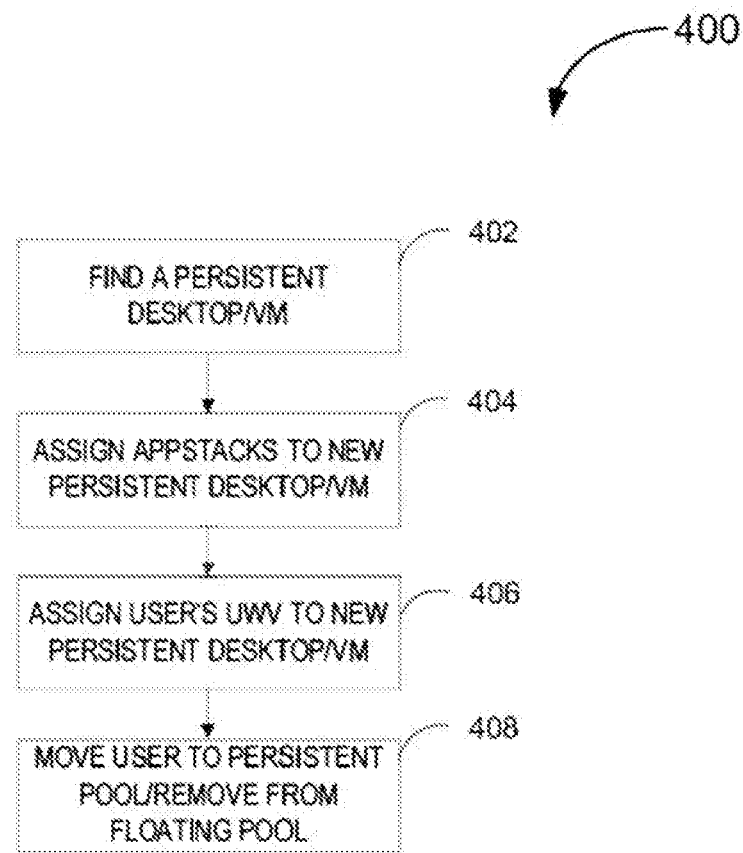
FIG. 4 is a flowchart of an exemplary method of the promotion workflow.
Figure 5:
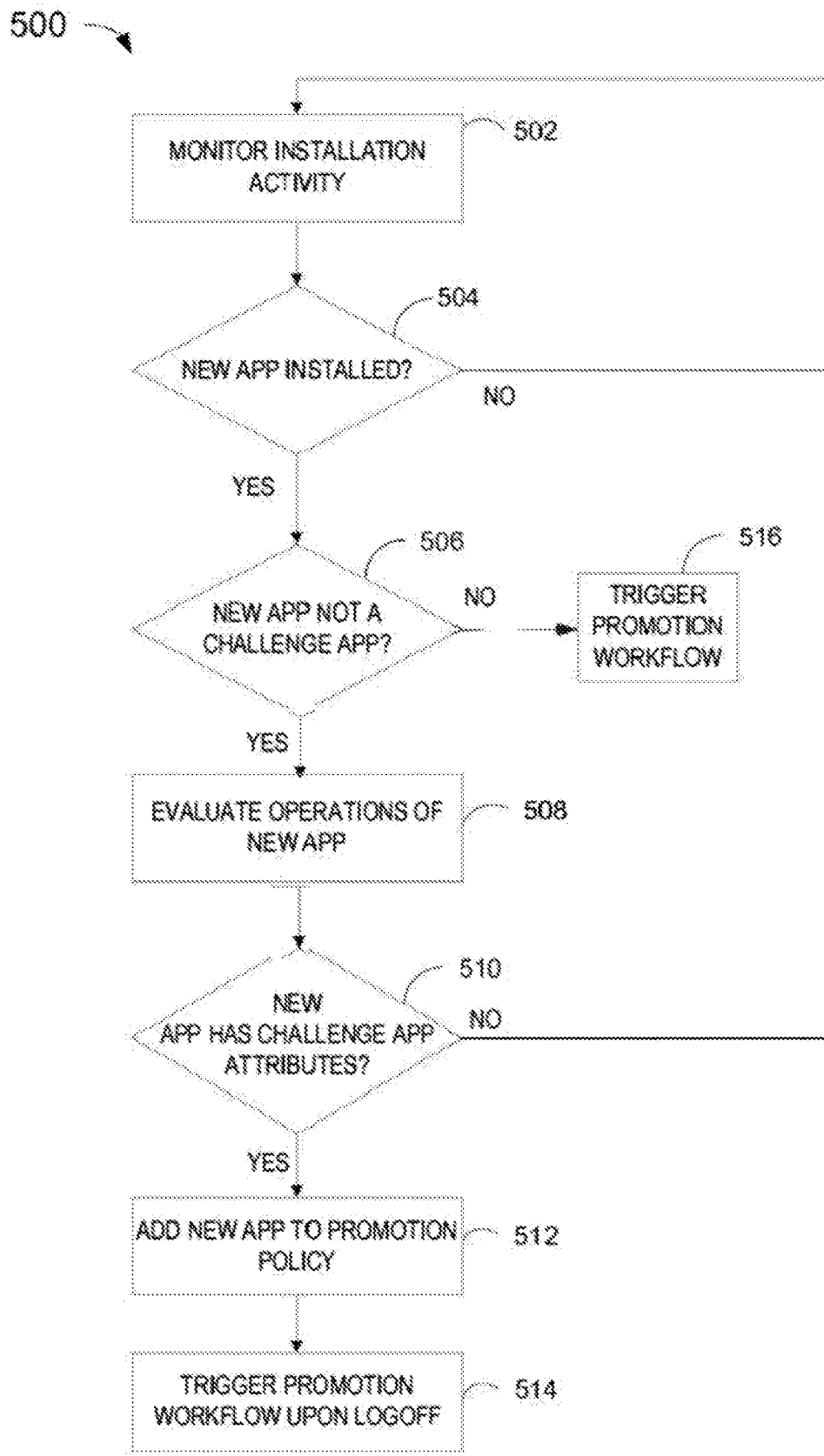
FIG. 5 is a flowchart of an exemplary method of evaluating applications to determine if the user-writable volumes associated with the application should be promoted from the floating pool to the persistent pool.

The virtual desktop broker 104 monitors the installation or mounting of applications by users or administrators, and evaluates the installed applications (see FIGS. 3, 4, and 5). The virtual desktop broker 104 communicates with the virtual infrastructure 124. It is contemplated that other logic, such as an agent executing at the operating system level, may perform some or all of the functions described herein with respect to the virtual desktop broker 104.

The virtual infrastructure 124 includes one or more host computing devices 106. The host computing device 106, also described in FIG. 10, includes a hypervisor 116 and a virtual machine execution space 114. Within the virtual machine execution space are at least two pools of virtual machines (VMs) 112: the floating pool 108 (e.g., non-persistent) and the persistent pool 110. The virtual infrastructure also includes one or more underlying storage devices 118. The underlying storage devices 118, in some examples, include a synthetic block device, such as a a common internet file system (CIFS), a network file system (NFS), virtual hard drive (VHD), or network-attached storage (NAS). The underlying storage device 118 also stores preferences associated with users, user-writable volumes 122 and application stacks 120.

Application stacks 120 are mountable virtual disks containing applications. Application stacks 120 are created by an application volumes agent, such as AppVolumes by VMware, Inc. An application volumes agent is able to roam user state between VMs by using VMDK mount to present a user state to a target VM at the time of user login, and to merge the mounted information into the OS of the target VM at the expected locations using its full file system and registry virtualization drivers. In this manner, the application contents appear as though they were actually present in the proper locations on a local drive (e.g., as though they had been installed with a traditional installer application). The application volumes agent delivers applications rapidly to physical or virtual desktops by way of mounting a virtual disk to a running OS. Upon mounting the virtual disk under the OS (performed by the hypervisor to plug in new virtual hardware, or by the OS using the VHD mount), a plug and play event occurs and the application volumes agent (e.g., a virtualization driver that represents data from the mounted disk into the expected location) in the OS examines a mapping file (e.g., resident in the root of the disk) to know where to represent the content from the disk (e.g., falsify the location so that it appears to be present natively in the registry or other configuration file). The application volumes agent further delivers applications, in real-time, rapidly to physical or virtual desktops by way of mounting a virtual disk to a running operating system. The application volumes agent places application management containers above the OS. Applications, data files, settings, middleware, and configurations act as separate, layered containers. The applications may be made accessible to a VM by mounting the virtual disk, rather than by installing the applications. These may be referred to as the application stacks 120 when in read-only mode, or writable volumes when in read-write mode.

Figure 2:
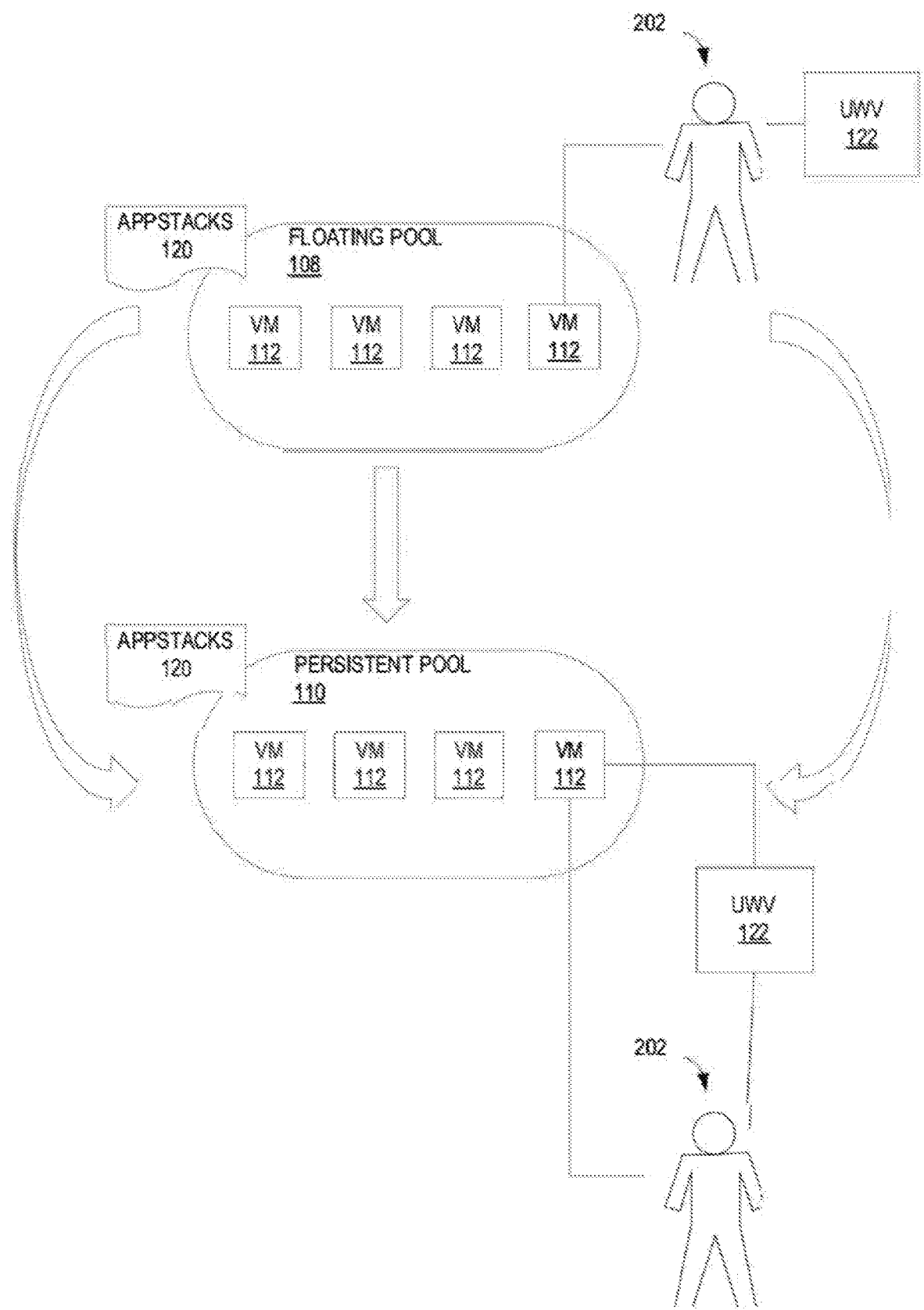
FIG. 2 is a block diagram of the promotion of the user-writable volume associated with a user from the floating pool to the persistent pool.

FIG. 2 is a block diagram of the promotion of the user-writable volume associated with a user from the floating pool to the persistent pool. In some examples, promotion of the user-writable volume is equivalent to promotion of a user, its associated user-writable volumes, and AppStacks. In the example of FIG. 2 a user 202 is initially (at the top of the figure) associated with a user-writable volume 122 and a virtual machine (VM) 112 in the floating pool 108. The user-writable volume 122 is not directly associated with the VM 112, because the VM 112 is initially provisioned from the floating pool 108. An application stack 120 is accessible to the floating pool 108, for the provisioning of the VM 112 for the user 202.

The bottom of the figure represents an exemplary relationship among the various elements after the user-writable volume 122 is promoted to, or associated with, the persistent pool 110. The user-writable volume 122 is promoted because an application meeting some criteria, such as a promotion policy, is installed on the user-writable volume 122 by the user 202, an administrator, etc. Upon detection of the application, described herein as a challenge application, the user-writable volume 122 is flagged, marked, tagged, or otherwise identified for promotion to the persistent pool 110 by the virtual desktop broker 104. Challenge applications are identified based upon characteristics or attributes determined to be problematic when running on VMs 112 provisioned from a non-persistent pool. As an example, challenge applications exhibit a high rate of abortion during launch, a failure to initialize properly if not initialized during bootup, a longer than average load time, or a higher rate of abortion or failure during launch.

Upon the user 202 logging off or going idle for an established period of time, the promotion workflow (described in more detail in FIG. 4) is executed. Under the promotion workflow, the VM 112 is moved from the floating pool 108 to the persistent pool 110. The user writable volume (UWV) 122 and the associated application stacks 120 remain associated with the VM 112 as it is moved to the persistent pool 110. At the bottom of FIG. 2, the user 202 is still associated with the UWV 122, but the UWV 122 is also directly associated with the VM 112. The UWV 122 and the VM 112 are now directly associated since the VM 112 is drawn from the persistent pool 110. Under those circumstances, the same VM 112 is used for that user 202 and the user's associated UWV 122 each time the user logs in.

FIG. 3 is a flowchart of an exemplary method of promoting a VM 112 associated with a user account (e.g. a user-writable volume 122 and application stack 120) from the floating pool to the persistent pool based upon an installed application. Under method 300, a new application is installed to the UWV 122 of a user 202 at 302. The application is mounted, or installed, by the user 202, administrator, etc. At 304 the virtual desktop broker 104 evaluates whether the application is a challenge application, or identified on a promotion policy. The promotion policy, in some examples, is a policy federated by an administrator identifying known challenge applications. If the new application is not a challenge application, or is not on the promotion policy at 304 then the user 202 is connected to or associated with a non-persistent virtual desktop at subsequent logins 312. In some examples, the non-persistent virtual desktop is any available VM 112 provisioned from the floating pool 108 at the time that the user 202 logs in. The promotion policy is, in some examples, heuristically updated as new data regarding applications is collected. As an example, a newly installed application is evaluated for inclusion in the promotion policy. If the failure rate of the newly installed application to properly load or execute exceeds an accepted failure rate, as defined under the promotion policy, then the newly installed application is added to the promotion policy. Other heuristic analysis may be performed in evaluating the applications. Any application which deviates from acceptable limitations is included in the promotion policy.

Alternatively, if at 304 the application is identified as a challenge application or it is on the promotion policy, then the promotion workflow is triggered during log off at 306. In other examples, if the user 202, UAW 122 or assigned VM 112 is idle for an identified period of time, the promotion policy is triggered. The idle time is, in some examples, a period greater than ten minutes. Alternatively, the idle time is established by the administrator. The promotion policy is disclosed in more detail in FIG. 4. At 308, the user 202 connects to a new persistent desktop, a VM 112 assigned from the persistent pool 110 at next login.

FIG. 4 is a flowchart of an exemplary method of the promotion workflow executed by the virtual desktop broker 104. Method 400 begins after the user 202 has logged off, and the UWV 122 is flagged for promotion. If the UWV 122 is not flagged for promotion, method 400 is not performed. At 402 the virtual desktop broker 104 locates an available persistent virtual desktop, in this example an available VM 112, in the persistent pool 110. The located VM 112 is assigned to or associated with the user 202, permanently (e.g., the same VM 112 is used each time that user 202 logs in). At 404, the application stacks 120 associated with the user 202 are assigned to the new persistent VM 112. The UWV 122 associated with the user 202 are assigned to the new persistent VM 112 at 406. At 408 the VM 112, and thus the user 202 and its associated UWV 122 and application stacks 120, are moved to the persistent pool 110 and removed from the floating pool 108. Upon subsequent logins, the user 202 uses the newly assigned persistent VM 112.

The promotion workflow is performed in some examples by an orchestration product. For example, vRealize Orchestrator (vRO), by VMware, Inc. vRO is its own server-side application that interfaces to the virtual desktop broker 104 and to the application volumes agent by using their Application Programming Interfaces (APIs). vRO creates plugins which are built to interface with an external product such as the application volumes agent and the virtual desktop broker 104, both of which have RESTful APIs.

FIG. 5 is a flowchart of an exemplary method of evaluating applications to determine if the VM 112, and its associated user-writable volumes, should be promoted from the floating pool to the persistent pool. Alternatively, they are associated with, entitled to, moved to, linked to, associated with, or otherwise drawn from the persistent pool. Conversely, at the same time that a VM 112 is promoted to the persistent pool it is removed from, de-associated, unentitled, de-entitled, etc. to the non-persistent pool. In this example, method 500 is initiated by the virtual desktop broker 104. However, in other examples the method is performed by the hypervisor 116 or the OS, or the Application Volume manager such as VMware's AppVolumes Manager. Optionally, at 502 the virtual desktop broker 104 is monitoring all installation activity of applications by users 202 or administrators on virtual desktops. In other examples, the virtual desktop broker 104 is notified by an installation tool when installation is performed, in some examples by an API. If a new application is installed at 504, then at 506 the virtual desktop broker 104 evaluates whether the new application is a challenge application. In some examples, a challenge application is identified by its inclusion in a promotion policy established by an administrator. If no new application is installed at 504, the virtual desktop broker 104 continues to monitor installation activity at 502, or to wait for notification that a new application is installed.

Upon determining that a new application is installed, if the application is already identified as a challenge application then the promotion workflow is triggered at 516. The promotion workflow is described in more detail at FIG. 4. If the newly installed application is not already identified as a challenge application, then the virtual desktop broker 104 evaluates the operations and other information on the new application at 508. At 510 the virtual desktop broker decides if the new application has characteristics of a challenge application, or other attributes which dictate that the applications should be treated as a challenge application.

In some examples, the virtual desktop broker 104 evaluates the new application by checking its name or globally unique identifier (GUID) against configuration data, such as registry, or a crowd sourced or online database of known challenge applications, to determine if it is a challenge application. A comparison between the installed application and any known problems or incompatibilities is made. Additionally, the virtual desktop broker 104 checks for relevant problematic file system changes under SnapVolumesTemp\Mountpoints\{GUID}\SVROT where new installation data is accessible. In other examples, the file system and registry data of the application itself is reviewed, to determine if there is known problematic content based on heuristic rules that generally indicate a challenge application. The virtual desktop broker 104 searches for anticipated or identified problematic registry changes in the following HKLM\SnapVolumes: {GUID}\SOFTWARE, {GUID}\SYSTEM, and {GUID}\Components. The virtual desktop broker 104 treats any changes discovered conservatively, flagging a new application which contains problematic content or known incompatibilities. As a further example, the virtual desktop broker 104 evaluates the subkeys of the application under FILM\SnapVolumes-{GUID}\SYSTEM\controlSet001\services for any of the following: a registry value called "Start" whose value is 0 or 1 (i.e., it is a driver), a subkey named "Linkage," a subkey named "Instances" that has a subkey with a registry value "Altitude" which is a REG DWORD whose number is less than 190000. In some examples, these are examples of known issues which cause the new application to be identified as a challenge application.

Upon determining that there is some attributes of a challenge application identified by the virtual desktop broker 104 at 510, the new application is added to the promotion policy at 512, in order to permit it to be more quickly identified in future installations. At 514, the promotion workflow is triggered upon the logoff of the user 202. If the new application is not determined to have attributes of a challenge application at 512, then the monitoring of application installation continues at 502.

The analysis performed under method 500 is, in some examples, heuristic. In other examples, known problems and incompatibilities such as an application installing an early driver, or an application dependent on a problematic supporting service, are flagged as requiring more analysis. If more analysis is required, a table of potential problems may be maintained. The virtual desktop broker 104 looks for specific patterns of application behavior based upon boot-up, loading times, early drivers, performance, failure rate, etc. Periodically the promotion policy is updated, in some examples, based on the analysis performed under method 500 to reflect any new challenge applications. In some examples, the promotion policy is updated each time a new challenge application is identified. As an example, the table is used to track any higher than average error or failure rate for applications, substantially increased provisioning time, or installation of an early driver. Problems are tracked or maintained in the table. Upon reaching some threshold number of problems, defined in some examples by an administrator or in a promotion policy, an application is identified as a challenge application.

In some examples, the analysis described above is performed by an agent that runs in the operating system, as an extension of the application volumes agent. This agent is, in some examples, is Forefront Identity Manager (FIM), by Microsoft Corporation. FIM has a self-contained service component and driver. The service component intercepts the installation of a new application, and at the end of the installation the analysis of the new application is performed.

Figure 6:
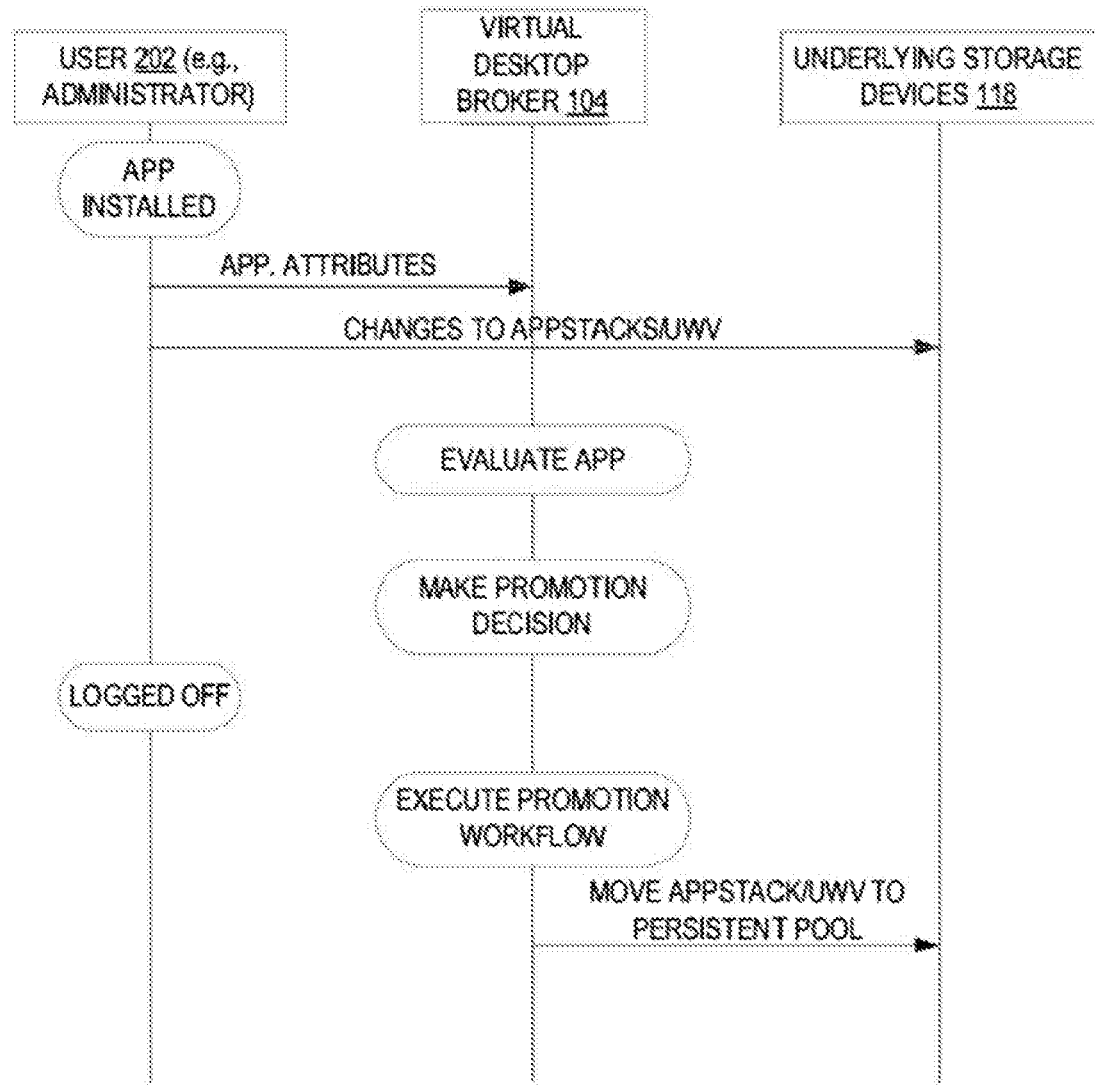
FIG. 6 is a sequence diagram of the operations performed, by a user, the virtual desktop broker, and the underlying storage device, during decision-free provisioning of virtual desktops.

FIG. 6 is a sequence diagram of the operations performed, by a user, the virtual desktop broker, and the underlying storage device, during decision-free provisioning of virtual desktops. An application is installed by the user 202, an administrator, or other entity. Upon the installation of the application, the virtual desktop broker 104 begins to monitor the characteristics of the application and to take note of which application is installed. The installation of the application also, in some examples, makes changes, on the underlying storage devices 118, to the UWV 122 and/or the application stacks 120 associated with the user 202. The virtual desktop broker 104 evaluates the newly installed application. In some examples, the application is compared to a promotion policy to determine if it is a known challenge application. The promotion policy, in some examples, represents a list of approved applications, or a list of disapproved applications. Alternatively, the virtual desktop broker 104 evaluates the characteristics, attributes, or the like, of the application to determine if it is predicted to be a challenge application. Based upon its comparison or evaluation, the virtual desktop broker 104 makes a promotion decision. Upon the user 202 logging off, the virtual desktop broker 104 executes its promotion decision. If the installed application does not satisfy the promotion policy, and it does not exhibit characteristics of a challenge application, then the promotion workflow is not executed (not illustrated). In the example illustrated in FIG. 6, the virtual desktop broker 104 determines that a VM 112 should be promoted, and it is moved with its associated UWV 122 in accordance with the promotion workflow. The virtual desktop broker 104 moves the VM 112, and its associated application stack 120 and UWV 122 associated with the user 202, to the persistent pool, making the appropriate changes on the underlying storage devices 118

Figure 7:
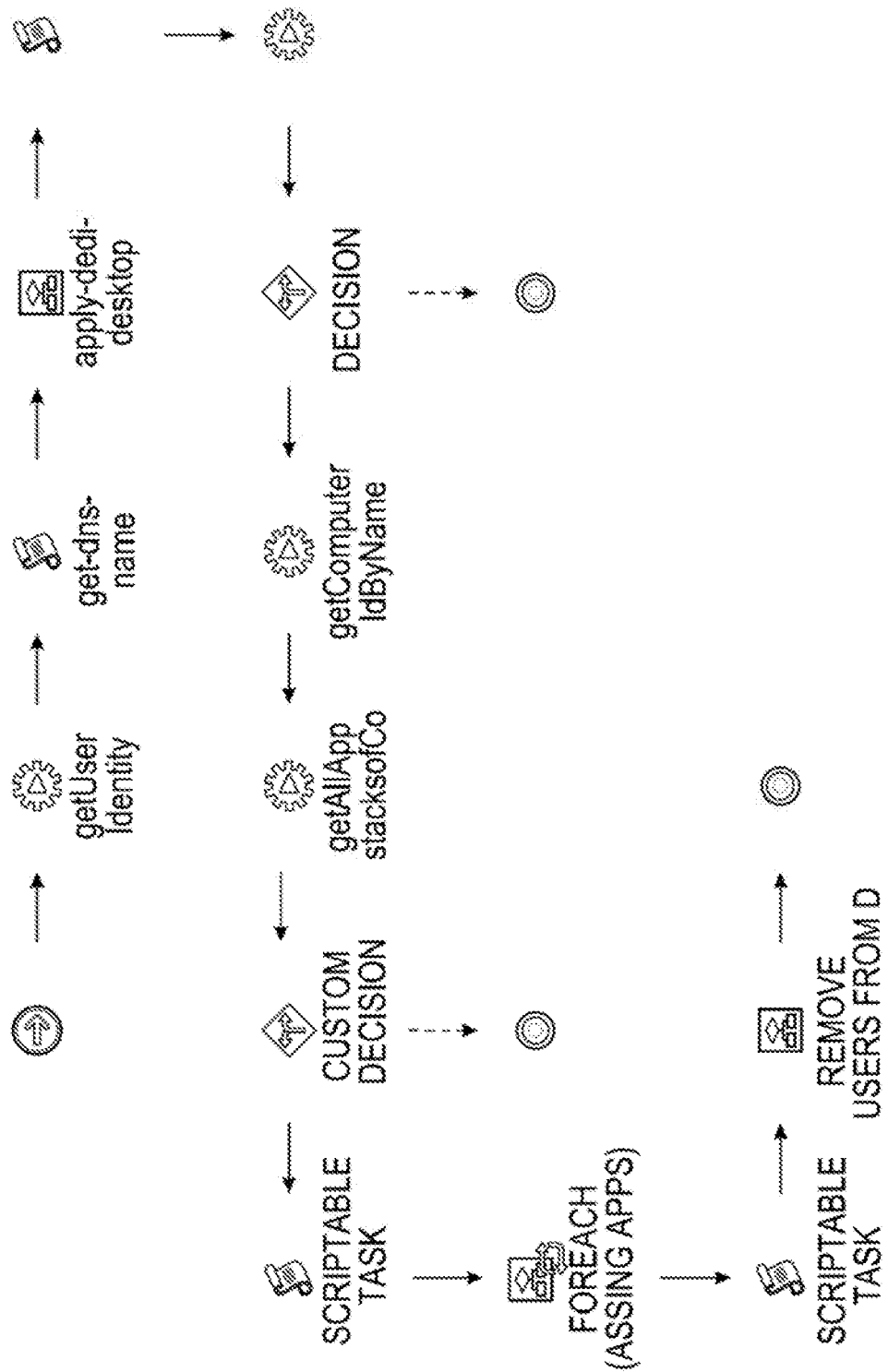
FIGS. 7 and 8 are sample workflows performed by the exemplary system during decision-free provisioning of virtual desktops.
Figure 8:
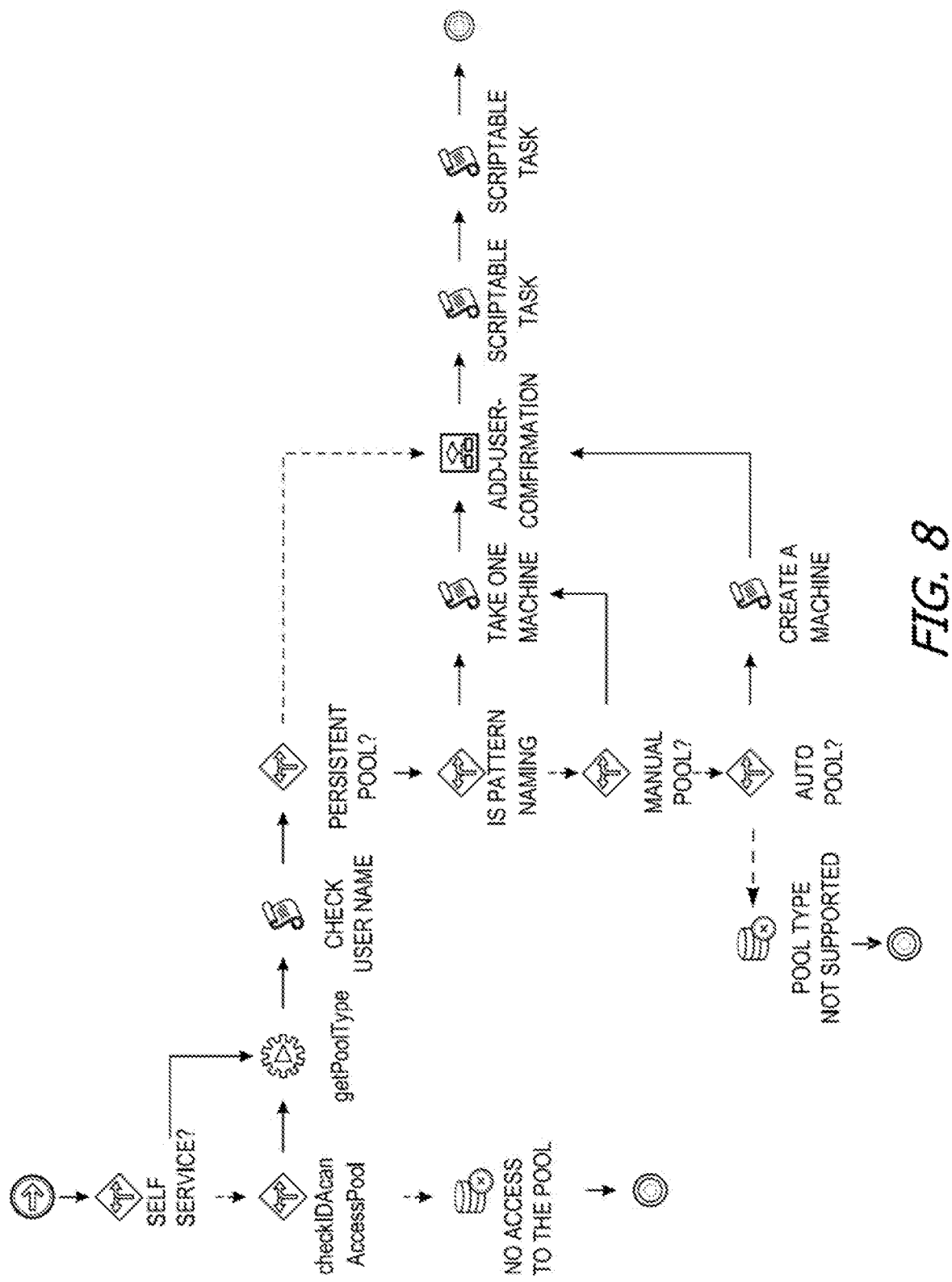

FIGS. 7 and 8 are sample workflows performed by the exemplary system during decision-free provisioning of virtual desktops. FIGS. 7 and 8 include several application programming interfaces (APIs) utilized during decision-free virtual desktop provisioning. As an example, the APIs getAllAppstacksofCo, getComputerIDByName, and getUserIdentity are utilized in FIG. 7.

Figure 9:
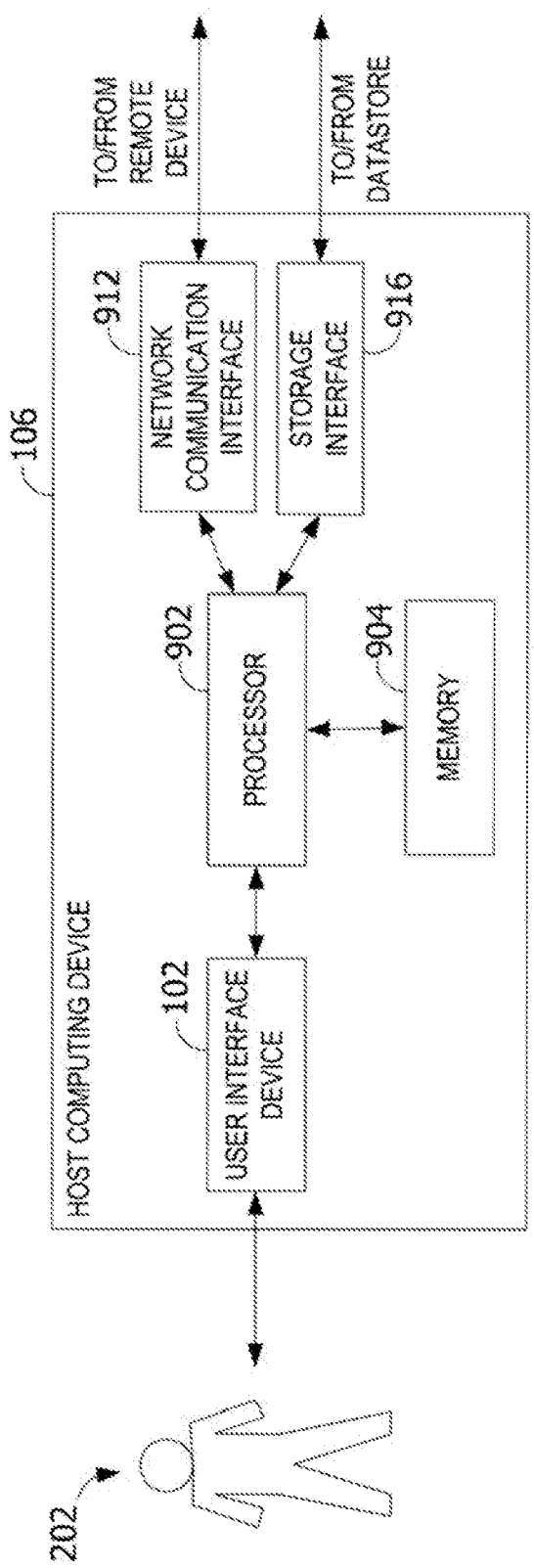
FIG. 9 is a block diagram of an exemplary host computing device.

FIG. 9 is a block diagram of an example host computing device 106. Host computing device 106 includes a processor 902 for executing instructions. In some examples, executable instructions are stored in a memory 904. Memory 904 is any device allowing information, such as executable instructions and/or other data, to be stored and retrieved. For example, memory 904 may include one or more random access memory (RAM) modules, flash memory modules, hard disks, solid state disks, and/or optical disks.

Host computing device 106 may communicate with a user interface device 102 for receiving data from a user 202 and/or for presenting data to user 202. User 202 may interact indirectly with host computing device 106 via another computing device such as a device running VMware's vCenter Server or other management device. User interface device 102 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 102 operates to receive data from user 202, while another device (e.g., a presentation device) operates to present data to user 202. In other examples, user interface device 102 has a single component, such as a touch screen, that functions to both output data to user 202 and receive data from user 202. In such examples, user interface device 102 operates as a presentation device for presenting information to user 202. In such examples, user interface device 102 represents any component capable of conveying information to user 202. For example, user interface device 102 may include, without limitation, a display device (e.g., a liquid crystal display (LCD), organic light emitting diode (OLED) display, or "electronic ink" display) and/or an audio output device (e.g., a speaker or headphones). In some examples, user interface device 102 includes an output adapter, such as a video adapter and/or an audio adapter. An output adapter is operatively coupled to processor 902 and configured to be operatively coupled to an output device, such as a display device or an audio output device.

Host computing device 106 also includes a network communication interface 912, which enables host computing device 106 to communicate with a remote device (e.g., another computing device) via a communication medium, such as a wired or wireless packet network. For example, host computing device 106 may transmit and/or receive data via network communication interface 912. User interface device 102 and/or network communication interface 912 may be referred to collectively as an input interface and may be configured to receive information from user 202.

Host computing device 106 further includes a storage interface 916 that enables host computing device 106 to communicate with one or more data storage devices, which store virtual disk images, software applications, and/or any other data suitable for use with the methods described herein. In example examples, storage interface 916 couples host computing device 106 to a storage area network (SAN) (e.g., a Fibre Channel network) and/or to a network-attached storage (NAS) system (e.g., via a packet network). The storage interface 916 may be integrated with network communication interface 912.

Figure 10:
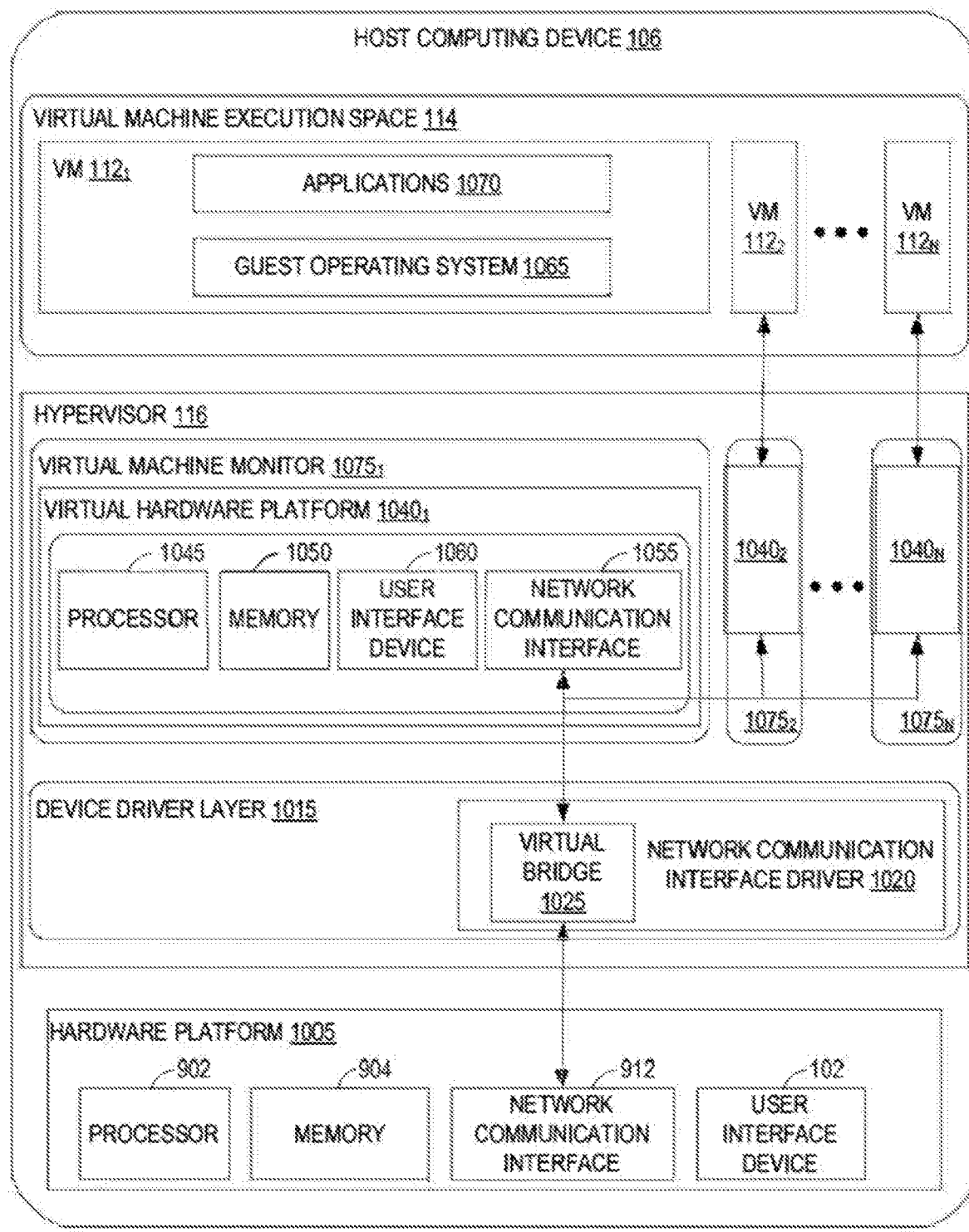
FIG. 10 is a block diagram of virtual machines that are instantiated on a computing device, such as the host computing device shown in FIG. 9.

FIG. 10 depicts a block diagram of virtual machines $112_1$, $112_2$ ... $112_N$ that are instantiated on host computing device 106. Host computing device 106 includes a hardware platform 1005, such as an x86 architecture platform. Hardware platform 1005 may include processor 902, memory 904, network communication interface 912, user interface device 102, and other input/output (I/O) devices, such as a presentation device 906 (shown in FIG. 9). A virtualization software layer, also referred to hereinafter as a hypervisor 116, is installed on top of hardware platform 1005.

The virtualization software layer supports a virtual machine execution space 114 within which multiple virtual machines (VMs $112_1$-$112_N$) may be concurrently instantiated and executed. Hypervisor 116 includes a device driver layer 1015, and maps physical resources of hardware platform 1005 (e.g., processor 902, memory 904, network communication interface 912, and/or user interface device 102) to "virtual" resources of each of VMs $112_1$-$112_N$ such that each of VMs $112_1$-$112_N$ has its own virtual hardware platform (e.g., a corresponding one of virtual hardware platforms $1040_1$-$1040_N$), each virtual hardware platform having its own emulated hardware (such as a processor 1045, a memory 1050, a network communication interface 1055, a user interface device 1060 and other emulated I/O devices in VM $112_1$). Hypervisor 116 may manage (e.g., monitor, initiate, and/or terminate) execution of VMs $112_1$-$112_N$ according to policies associated with hypervisor 116, such as a policy specifying that VMs $112_1$-$112_N$ are to be automatically restarted upon unexpected termination and/or upon initialization of hypervisor 116. In addition, or alternatively, hypervisor 116 may manage execution VMs $112_1$-$112_N$ based on requests received from a device other than host computing device 106. For example, hypervisor 116 may receive an execution instruction specifying the initiation of execution of first VM $112_1$ from a management device via network communication interface 912 and execute the execution instruction to initiate execution of first VM $112_1$.

In some examples, memory 1050 in first virtual hardware platform $1040_1$ includes a virtual disk that is associated with or "mapped to" one or more virtual disk images stored on a disk (e.g., a hard disk or solid state disk) of host computing device 106. The virtual disk image represents a file system (e.g., a hierarchy of directories and files) used by first VM $112_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 1015 includes, for example, a communication interface driver 1020 that interacts with network communication interface 912 to receive and transmit data from, for example, a local area network (LAN) connected to host computing device 106. Communication interface driver 1020 also includes a virtual bridge 1025 that simulates the broadcasting of data packets in a physical network received from one communication interface (e.g., network communication interface 912) to other communication interfaces (e.g., the virtual communication interfaces of VMs $112_1$-$112_N$). Each virtual communication interface for each VM $112_1$-$112_N$, such as network communication interface 1055 for first VM $112_1$, may be assigned a unique virtual Media Access Control (MAC) address that enables virtual bridge 1025 to simulate the forwarding of incoming data packets from network communication interface 912. In an example, network communication interface 912 is an Ethernet adapter that is configured in "promiscuous mode" such that all Ethernet packets that it receives (rather than just Ethernet packets addressed to its own physical MAC address) are passed to virtual bridge 1025, which, in turn, is able to further forward the Ethernet packets to VMs $112_1$-$112_N$. This configuration enables an Ethernet packet that has a virtual MAC address as its destination address to properly reach the VM in host computing device 106 with a virtual communication interface that corresponds to such virtual MAC address.

Virtual hardware platform $1040_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 1065 in order to execute applications 1070 for an instantiated VM, such as first VM $112_1$. Virtual hardware platforms $1040_1$-$1040_N$ may be considered to be part of virtual machine monitors (VMM) $1075_1$-1075N that implement virtual system support to coordinate operations between hypervisor 116 and corresponding VMs $112_1$-$112_N$. Those with ordinary skill in the art will recognize that the various terms, layers, and categorizations used to describe the virtualization components in FIG. 10 may be referred to differently without departing from their functionality or the spirit or scope of the disclosure. For example, virtual hardware platforms $1040_1$-$1040_N$ may also be considered to be separate from VMMs $1075_1$-1075N, and VMMs $1075_1$-1075N may be considered to be separate from hypervisor 116. One example of hypervisor 116 that may be used in an example of the disclosure is included as a component in VMware's ESX brand software, which is commercially available from VMware, Inc.

Additional Examples

The following scenarios are merely exemplary and not intended to be limiting in any way.

The disclosed decision-free adaptive promotion of a user and the user's associated user-writable volume or user account from a non-persistent to a persistent virtual desktop is performed in some examples, by a hypervisor or by the OS directly. The operation is adaptive at least because it routes the user to the proper architecture based on the applications assigned to the user. While the examples described herein reference a system with a one to one ratio between a user and a user-writable volume (UWV), in some examples, a user has multiple UWV(s). In that example, upon detection of a challenge application on any one of them, the 'user' is promoted which results in all of their UWVs being attached to the selected persistent desktop. While the disclosed method describes promoting UWVs, alternative designs are contemplated. As an example, if a user is assigned an application stack (AppStack) which is known to be a challenge application, the user is promoted. It is understood that promotion of UWVs, user accounts, and/or users are described interchangeably herein.

In either example, the system mounts the virtual disk under the operating system. That is either performed by the hypervisor in the case of virtual desktop environments, or it is performed by the operating system itself directly, in the case of VHD-mounted virtual disks. In the hypervisor context, the hypervisor inserts new virtual hardware under the operating system. VHD is a Microsoft Corporation format for virtual disks, which the operating system itself mounts and which look like locally-attached disks.

The disclosed system is not limited to a virtual desktop, but is also applicable to container assignments to VMs. In that example, a non-persistent or floating pool of virtual machines are designed to handle the mounting of container applications that are known to function properly. Additionally, there are container applications that are flagged as not functioning well if dynamically installed. When a user, a tenant at a service provider, or a company requests a new container, a decision is made whether there should be a static assignment of the container to a VM or whether the container can remain floating and wait until the user actually uses the container before it is coupled to the VM. Any system with static versus dynamic assignment of resources is amenable to the disclosed system.

The disclosed system is also applicable to non-virtualized environments. As an example, VHDs are typically mounted when a user logs into their physical machine. However, some VHDs may benefit from earlier mounting. In the event that a VHD should be mounted early, the agent may trigger the VHD mount before the user logs in. As an example the mounting is triggered by powering on a machine, or at a certain time.

There is a class of applications where even the application volumes filter driver has to start in order to mount the disk and to merge the contents of the disk into the OS. That process may be referred to as filtering. That filtering starts quite early and in some examples addresses almost all of the identified challenge applications. However, some applications want to start even earlier, in some examples because the applications have their own filter driver that needs to start before the application volumes filter driver. These specialized challenge applications, which are not resolved by the promotion policy described above, are promoted to a traditional full-clone VM, or a VM which utilizes Mirage, by VMware, Inc. or other software, which actually embeds the software into the operating system. These applications, users, and UWV are not managed by the application volumes agent any longer. In some examples this is referred to as second-phase or stage two promotion.

Exemplary Operating Environment

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs. It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The examples illustrated and described herein as well as examples not specifically described herein but within the scope of aspects of the disclosure constitute exemplary means for adaptive assignment of an application to a promotion policy, and promoting an associated user-writable volume, user, or user account from a non-persistent pool to a persistent pool. For example, the elements illustrated in FIGS. 1, 2, 9, and/or 10, such as when encoded to perform the operations illustrated in FIGS. 3, 4, 5, 6, 7, and/or 8, constitute exemplary means for monitoring the installation of a first application to a first user-writable volume of the non-persistent virtual desktop and exemplary means for evaluating the operation of the first application. Further, elements also constitute exemplary means for taking action upon determining that the first application has one or more characteristics of a challenge application. The exemplary means include means for including the first application in a promotion policy, means for identifying for promotion the user-writable volume associated with the first application, means for locating an available persistent virtual desktop, means for assigning the identified user-writable volume to the available persistent virtual desktop, means for promoting the identified user-writable volume by associating them with the persistent pool, and means for de-associating the identified user-writable volumes with the non-persistent pool.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

We claim:

1. A system for adaptive promotion of a virtual machine (VM) in a non-persistent pool to a persistent pool, said system comprising:
    a storage device storing a plurality of user accounts, the user accounts associated with a non-persistent pool; and
    an agent executing computer-executable instructions to:
    monitor installation of an application on a user writable volume (UWV) associated with a user account of the plurality of user accounts, the user account being associated with a virtual machine (VM) from a non-persistent pool;
    evaluate attributes of the application;
    upon determining, based on the evaluated attributes, that the application has one or more attributes of a challenge application, move the VM from the non-persistent pool to a persistent pool; and
    de-associate the VM from the non-persistent pool and update a promotion policy to include the application in the promotion policy for future installations.

2. The system of claim 1, wherein the promotion policy includes applications incompatible with VMs provisioned from the non-persistent pool.

3. The system of claim 1, wherein the user account is permanently associated with the VM.

4. The system of claim 3, wherein permanently associating the user account with the VM includes enabling services and drivers to start early in a boot up process.

5. The system of claim 1, wherein moving the VM from the non-persistent pool to the persistent pool includes associating the UWV and associated application stacks of the user account with the VM.

6. The system of claim 1, wherein the promotion policy is heuristically updated as new data regarding applications is collected.

7. The system of claim 1, wherein the VM is provisioned by attaching shared copy-on-write (COW) pages to the VM upon provisioning.

8. A method comprising:
    monitoring installation of an application on a user writable volume (UWV) associated with a user account, the user account being associated with a virtual machine (VM) from a floating pool;
    evaluating attributes of the application;
    upon determining, based on the evaluated attributes, that the application has one or more attributes of a challenge application, moving the VM from the floating pool to a persistent pool; and
    de-associating the VM from the floating pool and updating a promotion policy to include the application in the promotion policy for future installations.

9. The method of claim 8, wherein the promotion policy includes applications incompatible with VMs provisioned from the floating pool.

10. The method of claim 8, wherein the user account is permanently associated with the VM.

11. The method of claim 10, wherein permanently associating the user account with the VM includes enabling services and drivers to start early in a boot up process.

12. The method of claim 8, wherein moving the VM from the floating pool to the persistent pool includes associating the UWV and associated application stacks of the user account with the VM.

13. The method of claim 8, wherein the promotion policy is federated by identifying known challenges to applications that are installed by a user of the user account.

14. The method of claim 8, wherein the promotion policy is heuristically updated as new data regarding applications is collected.

15. The method of claim 8, wherein the VM is provisioned by attaching shared copy-on-write (COW) pages to the VM upon provisioning.

16. A non-transitory computer-readable medium that includes instructions that, when executed by a processor, perform operations including:
    monitoring installation of an application on a user writable volume (UWV) associated with a user account, the user account being associated with a virtual machine (VM) from a floating pool;
    evaluating attributes of the application;
    upon determining, based on the evaluated attributes, that the application has one or more attributes of a challenge application, moving the VM from the floating pool to a persistent pool; and
    de-associating the VM from the floating pool and updating a promotion policy to include the application in the promotion policy for future installations.

17. The non-transitory computer-readable medium of claim 16, wherein the promotion policy includes applications incompatible with VMs provisioned from the floating pool.

18. The non-transitory computer-readable medium of claim 16, wherein the user account is permanently associated with the VM.

19. The non-transitory computer-readable medium of claim 16, wherein moving the VM from the floating pool to the persistent pool includes associating the UWV and associated application stacks of the user account with the VM.

20. The non-transitory computer-readable medium of claim 16, wherein the promotion policy is federated by identifying known challenges to applications that are installed by a user of the user account.

* * * * *